United States Patent [19]

Biscomb

[11] Patent Number: 4,598,210
[45] Date of Patent: Jul. 1, 1986

[54] WATER CURRENT MOTOR

[76] Inventor: Lloyd I. Biscomb, 4452 Burlington Pl., NW., Washington, D.C. 20016

[21] Appl. No.: 609,318

[22] Filed: May 11, 1984

[51] Int. Cl.$^4$ ............................................. F03B 7/00
[52] U.S. Cl. ...................................... 290/43; 290/54; 415/7; 416/11
[58] Field of Search ...................... 290/42, 43, 53, 54; 415/7; 416/9, 11, 85; 114/266

[56] References Cited

U.S. PATENT DOCUMENTS

| | | |
|---|---|---|
| 313,746 | 3/1885 | Man . |
| 328,418 | 10/1885 | Main . |
| 328,447 | 10/1885 | Brady . |
| 385,261 | 6/1888 | Garrison . |
| 424,566 | 4/1890 | Mills . |
| 638,123 | 11/1899 | Ingels . |
| 1,067,722 | 7/1913 | Fairbanks . |
| 1,113,440 | 10/1914 | Hughes . |
| 1,147,658 | 7/1915 | Stukes . |
| 3,912,937 | 10/1975 | Lesser . |
| 3,978,345 | 8/1976 | Bailey . |
| 3,986,787 | 10/1976 | Moulton . |
| 4,104,536 | 8/1978 | Gutsfeld ............................. 290/54 |
| 4,179,886 | 12/1979 | Tsubota . |
| 4,260,902 | 4/1981 | Crider . |
| 4,262,211 | 4/1981 | Streczyn . |
| 4,270,056 | 5/1981 | Wright ............................. 290/54 |
| 4,301,377 | 11/1981 | Rydz . |
| 4,313,059 | 1/1982 | Howard . |
| 4,340,821 | 7/1982 | Slonim ............................. 290/53 |
| 4,423,333 | 12/1983 | Rossman ......................... 416/11 X |

FOREIGN PATENT DOCUMENTS

| | | | |
|---|---|---|---|
| 717946 | 1/1932 | France ............................. 416/85 |
| 58-25591 | 2/1983 | Japan ............................. 415/7 |
| 58-62381 | 4/1983 | Japan ............................. 415/7 |

Primary Examiner—Bernard Roskoski
Assistant Examiner—W. E. Duncanson, Jr.
Attorney, Agent, or Firm—Cushman, Darby & Cushman

[57] ABSTRACT

A hull floating on a body of water is tethered by an anchored mooring cable so that it is disposed to trail from the anchor in a current. The hull supports a rotary load such as an electric generator, air compressor or water pump having a transversely extending rotary input shaft extending beyond the hull in both lateral directions. Balanced sets of vanes arranged in wheels mounted to respective ends of the shaft are disposed in a partially submerged condition to be turned by the water current, thus turning the shaft and the rotary load. A load output conduit is provided for transmitting the load output from the load. Where the current changes direction periodically, the load output conduit may follow the mooring cable and both be pivotally mounted to the anchor so that the hull may swing around as the current changes direction. A debris-deflecting fender is shown.

11 Claims, 6 Drawing Figures

WATER CURRENT MOTOR

BACKGROUND OF THE INVENTION

Over the years many innovators have become intrigued by the prospect of economically harvesting power from water currents such as from rivers where current flow is unidirectional, and estuaries where current direction may reverse with the tide. In that connection various floating devices have been proposed for reacting against the current to turn a shaft which is coupled to a rotary load. However, it is clear that among such prior art current motors none has become or remains popular, nor is any now put to widespread use in spite of the interest and the potentiality. In the opinion of the present inventor, the fact that the prior innovators in the field have not produced a presently successful, popular current motor has generated commonly accepted wisdom that water wheels are no longer an economical way of generating power, to the detriment of society.

SUMMARY OF THE INVENTION

A hull floating on a body of water is tethered by an anchored mooring cable so that it is disposed to trail from the anchor in a current. The hull supports a rotary load such as an electric generator, air compressor or water pump having a transversely extending rotary input shaft extending beyond the hull in both lateral directions. Balanced sets of vanes arranged in wheels mounted to respective ends of the shaft are disposed in a partially submerged condition to be turned by the water current, thus turning the shaft and the rotary load. A load output conduit is provided for transmitting the load output from the load. Where the current changes direction periodically, the load output conduit may follow the mooring cable and both be pivotally mounted to the anchor so that the hull may swing around as the current changes direction. A debris-deflecting fender is shown.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the Drawings

FIG. 4 is a top plan view of a second embodiment of the current motor;

DETAILED DESCRIPTION

Figure 1:
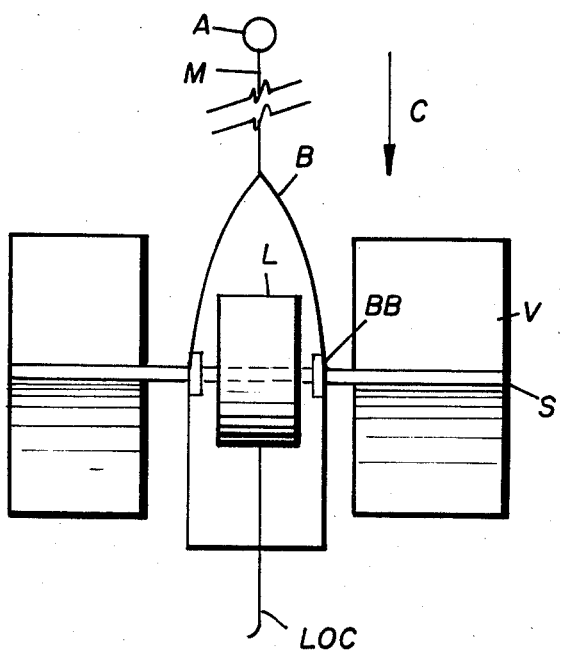
FIG. 1 is a top plan view of a front embodiment of a current motor embodying principles of the present invention.
Figure 2:
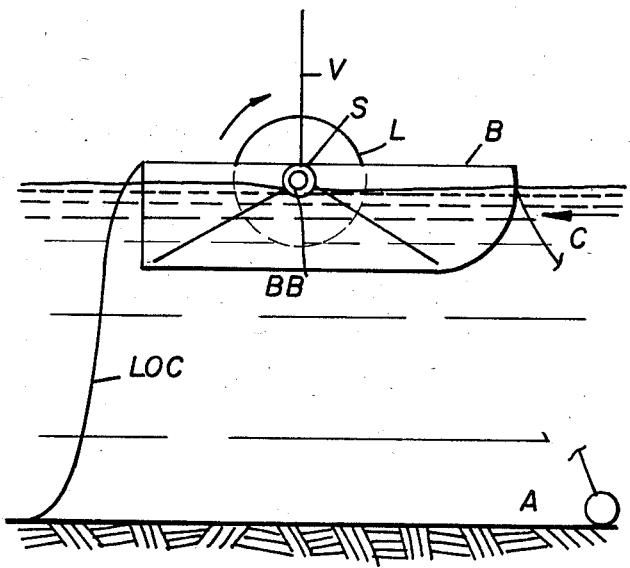
FIG. 2 is a side elevation view thereof.
Figure 3:
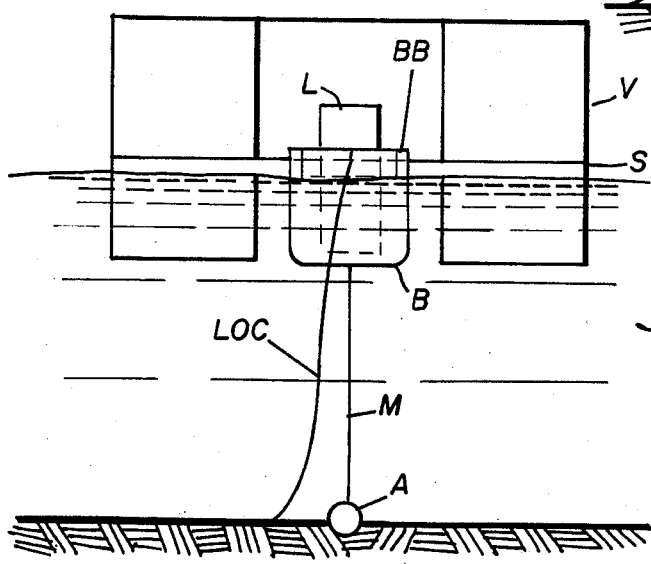
FIG. 3 is a rear elevation view thereof.
Figure 1:
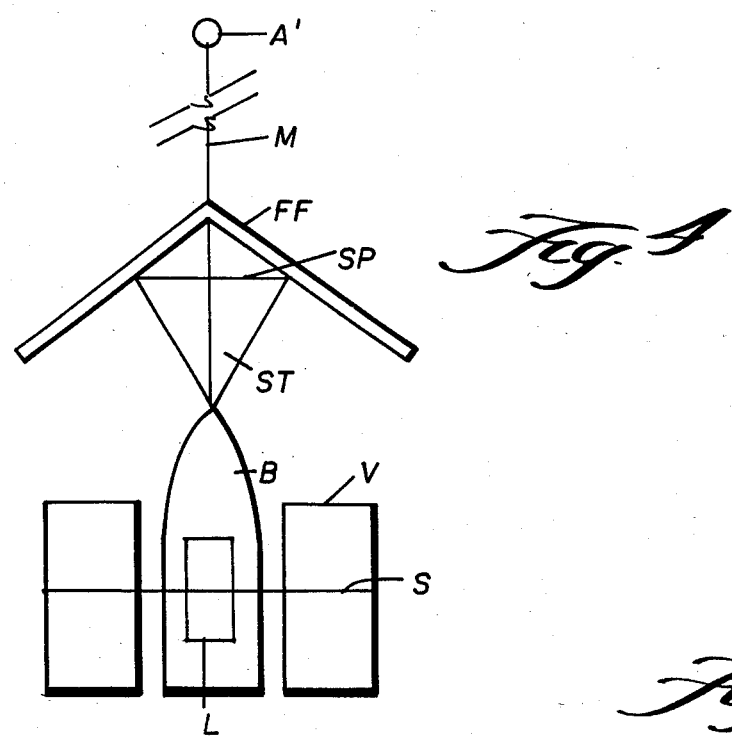

In FIGS. 1-3 a hull such as of a pontoon or boat is illustrated as B, floating, buoyantly, on a body of water such as a river, lake, estuary, bay or the like, where there is a definite directional flow of at least some of the water at least some of the time, i.e. a water current C.

The apparatus is shown including an anchor A, which, in the instance illustrated is fixedly mounted in the earth on the subaquatic bottom. A mooring cable M that preferably is flexible, strong and relatively inextensible is shown connected between the anchor A and the hull B, e.g. at the prow of the latter, so that the hull may trail in the current from the anchor A.

On board the hull B, e.g. mounted transversely amidship, is shown a rotary load L such as an electric generator, an air compressor, a water pump or the like. The rotary load L is provided with a rotary input shaft S which extends transversely, laterally both to the left and to the right of the rotary load, so much so as to extend outboard of the hull in both lateral directions. In the instance depicted, the gunwales of the hull are shown provided on both sides near the waterline with bearings BB through which the shaft S extends. These bearings support the cantilevered portions of the shaft S on the hull B and journal the shaft for rotation.

Outboard of the bearings BB, at each end, the shaft supports respective, comparable and balanced sets of vanes V, arranged in respective wheels. On each vane wheel, the number of vanes V is at least three, the angular spacing about the shaft from vane to vane is equal, e.g. so that when there are three vanes in each set, the vane to vane spacing is one hundred-twenty degrees. By preference, the vanes are simple, planar paddle-shaped structures each arranged in a respective plane which radiates from the longitudinal axis of the shaft S. More elaborate shapes could be provided. The vanes V are so balanced at the opposite ends of the shaft that as one on one wheel dips beneath the surface of the water, a comparable one on the other wheel dips beneath the surface of the water, and as one on one wheel emerges from the water into the air, a comparable one on the other wheel emerges from the water into the air. In the presently preferred embodiment, no means are provided for feathering the vanes as they return upstream through the air, on the assumption that wind force against the rotation direction would be negligible in relation to current force on the submerged vanes. However, wherever such an assumption is not borne out in fact, suitable feathering means (not shown) may be provided for the vanes returning upstream through the air.

The load L further includes a load output conduit LOC, the nature of which will depend on the nature of the load and on the distance that the load output is to be transmitted. For instance, the load output conduit could be an electrical cable, a compressed air line, a pressurized water line, a flexible torque-transmitting shaft, a vacuum line, a steam hose or the like.

In some instances, the power generated by turning the shaft S of the load would be arranged to be consumed on board the hull, so that the load output conduit LOC would connect with a poweroperated device (not shown) located on board the hull B. For instance, the load output conduit LOC might be an electrical power line connected to lights, horns, bells or the like for marking a channel, or a shoal or other navigational hazard to shipping.

However, in many instances, the load output provided by the load L would be wanted at an on shore location. For such instances, the load output conduit LOC is shown leading from the hull B, e.g. by trailing over the stern in this embodiment, and extending to the remote site where the load output is to be used.

Figure 5:
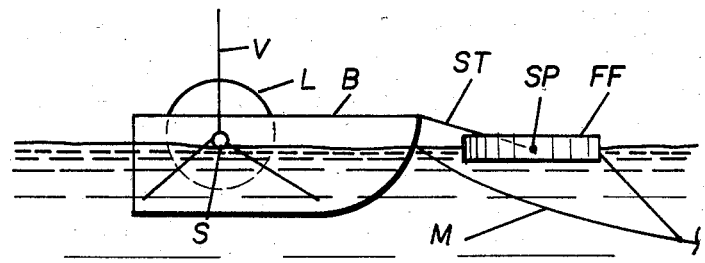
FIG. 5 is a side elevation view thereof.
Figure 6:
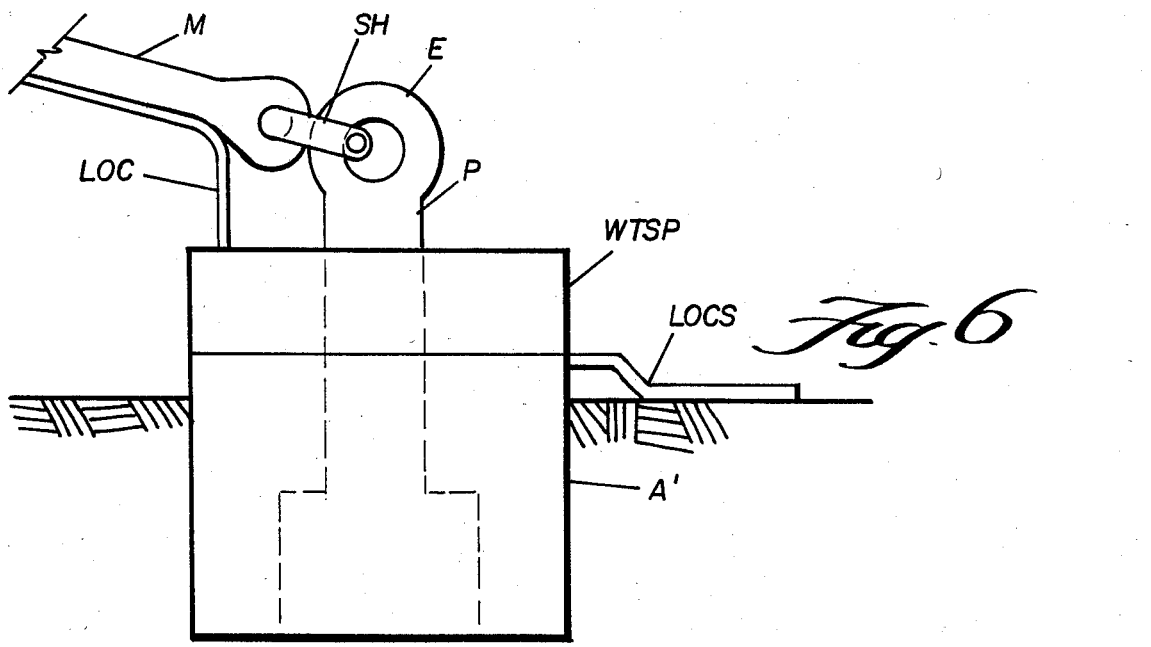
FIG. 6 is an enlarged fragmentary elevation view showing connections of the mooring line and load output conduit with the anchor of the second embodiment.

An elaboration and variation are disclosed with reference to FIGS. 4-6.

As it happens, in some bodies of water where it would be convenient to use the current motor of the present invention, the water current C periodically reverses direction, for instance in a drowned river affected by tidal flows. One way to accommodate such a reversal of current direction using the apparatus of FIGS. 1-3 would be to provide the hull B with a prow at each end, canoe fashion, with a duplicate of the anchor A and mooring line M similarly anchoring the other prow of the hull, so that without changing position itself, the hull B trailed from alternate ones of the anchors by corresponding ones of the mooring lines as the current changed direction. In such an instance, the load L would be constructed to provide a like output regardless of the direction that the shaft S is turned, or suitable switching or transmission means would be provided to cause the load L to effectively provide the same sense and kind of output regardless of the sense of rotary input by the shaft S.

However a presently preferred alternative is illustrated in FIGS. 4-6. Here, the stationary anchor A' mounts and journals for non-rising rotation about a vertical axis a pin P and the rotary element of a set of water-tight slip rings WTSR, the stationary element of which may be incorporated in the stationary anchor A'. In this instance, where the load output is wanted at an off board location, the load output conduit LOC follows the mooring cable M down to the anchor. There, the mooring cable M is shown secured to the eye E of the pin P by means of a shackle SH which permits the respective end of the mooring cable M to rotate about the anchor A' and to tilt, while remaining operatively connected thereto via the pin P. Similarly, the load output conduit LOC operatively connects with the rotary element of the set of water-tight rotary slip rings WTSR. Load output flows through the rotary element of the set of water-tight slip rings WTSR to the stationary element thereof in the anchor A' and thence to the load output conduit to shore LOCs which is operatively connected with the anchor A'.

Thus, in the embodiment shown in FIGS. 4-6, as the direction of the current reverses, all of the structure that is connected to the anchor A' by the pin P and slip rings WTSR rotates, e.g. one hundred-eighty degrees about the generally vertical axis of the pin P. (For this embodiment, either the load output conduit LOC must be so supported that it does not drag on the subaquatic bottom as the structure pivots when the current direction changes, or the load output conduit LOC must be made adequately abrasion and snag resistant, and the bottom must be cleared of any boulders, overhanging ledges, coral beds or the like, such as might otherwise catch the load output conduit. Further, the hull B must be so moored that it is clear to rotate one-hundred eighty degrees in both angular senses, i.e. in a three hundred-sixty degree arc unless some provision is made (not shown) to ensure that rotation in both angular senses is always through the same one hundred-eighty degree arc.)

The particular design of the water-tight rotary slip rings WTSR is not part of the present invention. Suitable rotary joints for transmitting electrical power, mechanical power, compressed air, pressurized fluid and the like all are well known and commercially available. The degree of water-tightness needed is somewhat dependent on the type of load output, a greater degree of water-tightness being wanted when transmitting electrical power (to prevent electrical shorts) than when transmitting pressurized water, for instance (where the principal and perhaps only result of a small amount of leakage is a corresponding lowering of overall efficiency).

To prevent damage to the vanes V by floating debris, an e.g. V-shaped floating fender FF may be attached to the mooring cable M up-current from the hull B, as shown in FIGS. 4 and 5. A rigid spreader bar SP is shown placed in compression transversely between the two legs of the vee of the floating fender FF distally of its apex for keeping the two legs of the fender separated and deployed as shown. Stabilizer bars ST placed in compression between the floating fender FF at the opposite ends of the spreader bar SP and the prow of the hull B act to keep the floating fender FF oriented to deflect floating debris from impacting the hull B or the vanes V. To this end, the legs of the floating fender FF need to be spread wide enough and extended to such length as to provide a sufficient "umbrella" of protection, but dip insignificantly below the water surface so as to avoid appreciably lowering the current force C on the submerged vanes V. Although this fender structure has been illustrated only on the embodiment shown in FIGS. 4-6, it can be helpfully provided in substantially the same manner and to the same effect on the embodiment shown in FIGS. 1-3.

The current motor of the present invention may be made of usual materials, no use of any unusual material being essential to all successful practices of the invention, nor to the presently preferred embodiments thereof.

It should now be apparent that the water current motor as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A water current motor, comprising:
   a hull constructed and arranged to float on the surface of a body of water which has a current;
   an anchor constructed and arranged to be fixed at a desired location;
   a mooring line constructed and arranged to tether the floating hull to the fixed anchor, so that the hull trails in the current from the anchor;
   a load constructed and arranged to convert a rotary input into a useful output, said load including a rotary input shaft means which projects generally horizontally in opposite directions therefrom, said load further including a load output conduit constructed and arranged for conducting said useful output from said load;
   said load being disposed on said hull so that said shaft means, on both sides of said hull projects transversely outboard of said hull near said water surface;
   two similar and balanced sets of vanes arranged in respective wheels and secured on said shaft means, outboard of said hull, respectively on opposite sides of said load;
   each set of vanes comprising at least three equi-angularly spaced vanes constructed and arranged to sequentially dip below the surface of the water, be pushed downstream by force of the water current thereagainst, to clear the surface of the water and return upstream in the air above the surface of the water, thereby rotating said shaft and operating said load to produce said load output;

a floating fender constructed and arranged to float on the surface of said body of water upstream of said hull; and means mounting the floating fender with respect to the hull and with respect to the mooring line and being constructed and arranged to deploy the floating fender so widely but so shallowly that the floating fender effectively prevents floating debris from impacting said hull and said vanes, while not appreciably deflecting water current from forcibly acting on said vanes to turn said shaft.

2. The water current motor of claim 1, wherein:

said anchor includes a fixed portion constructed and arranged to be fixed to the ground below said body of water, and a rotary portion rotatably connected therewith, constructed and arranged to rotate about a generally vertical axis, and constructed and arranged to have said mooring line connected therewith, so that as said current reverses direction said hull, mooring line and rotary portion may rotate about said generally vertical axis to cause said hull to continue to trail from said anchor on said mooring line in said current.

3. The water current motor of claim 1, wherein:

said load output conduit extends off board said hull from said load to a remote location.

4. The water current motor of claim 2, wherein:

said load output conduit extends off board said hull from said load to a remote location.

5. The water current motor of claim 4, wherein:

said anchor includes a set of water-tight rotary slip rings on said anchor including a rotary portion on said rotary portion of said anchor and a stationary portion on said stationary portion of said anchor; and said load output conduit extends at least generally along said mooring line from said hull to said anchor, and at said anchor operatively extends through said set of slip rings.

6. The water current motor of claim 1, wherein:

said anchor is constructed and arranged to be fixed to the ground below said body of water.

7. The water current motor of claim 1, wherein:

said load is constituted by an electric generator constructed and arranged to provide electric power as said useful output and said load output conduit comprises an electric power cable.

8. The water current motor of claim 1, wherein:

said load is constituted by an air compressor constructed and arranged to provide compressed air as said useful output and said load output conduit comprises a compressed air hose.

9. The water current motor of claim 1, wherein:

said load is constituted by a water pump constructed and arranged to provide a stream of water under pressure as said useful output and said load output conduit comprises a hose for pressurized water.

10. The water current motor of claim 1, wherein:

said hull includes two upstanding opposite side walls, each having a respective bearing mounted therein; and said shaft means projects from said load outboard of said hull through both of said bearings, being supported thereby and journalled therein for rotation.

11. The water current motor of claim 1, wherein:

said vanes are each constituted by a paddle-like element which radiates from said shaft means in a plane parallel to the longitudinal axis of said shaft means.

* * * * *